United States Patent [19]

Terry

[11] 4,240,773
[45] Dec. 23, 1980

[54] ROLL HANDLING APPARATUS

[76] Inventor: Melvin D. Terry, P.O. Box 7174, Seattle, Wash. 98133

[21] Appl. No.: 939,806

[22] Filed: Sep. 5, 1978

[51] Int. Cl.³ .............................................. B65G 7/06
[52] U.S. Cl. ................................... 414/664; 180/125; 414/911
[58] Field of Search ................................ 180/116–124, 180/125; 414/664, 667, 671, 458, 459, 911; 280/43.12, 43.13, 43.14, 43.15, 47.35, 47.37 R

[56] References Cited

U.S. PATENT DOCUMENTS

| 2,505,352 | 4/1950 | Dillon | 414/911 X |
| 3,202,232 | 8/1965 | Rogers | 180/119 |
| 3,239,022 | 3/1966 | Dolphin | 180/116 |
| 3,261,177 | 7/1966 | Amann | 180/125 X |
| 3,326,311 | 6/1967 | Jung | 180/125 |
| 3,450,288 | 6/1969 | Walsh | 214/653 |
| 3,741,418 | 6/1973 | Gamundi | 214/512 |
| 3,828,884 | 8/1974 | Burdick | 180/125 |
| 3,831,708 | 8/1974 | Terry | 180/119 |

Primary Examiner—Stephen G. Kunin
Assistant Examiner—Terrance L. Siemens
Attorney, Agent, or Firm—Cole, Jensen & Puntigam

[57] ABSTRACT

Apparatus for handling large rolls of paper or spools of wire including a pair of outwardly extending arms, supported by air bearings, which straddle the roll or reel along the axis in a lower hemisphere. The roll is lifted upon inflation of the bearing and transported to its desired location. The parallel arms are adjustable toward and away from each other to accommodate rolls of varying diameters and may include stabilizing members for use with a reel in the event the arms are not of a sufficient length to extend beneath both flanges.

6 Claims, 9 Drawing Figures

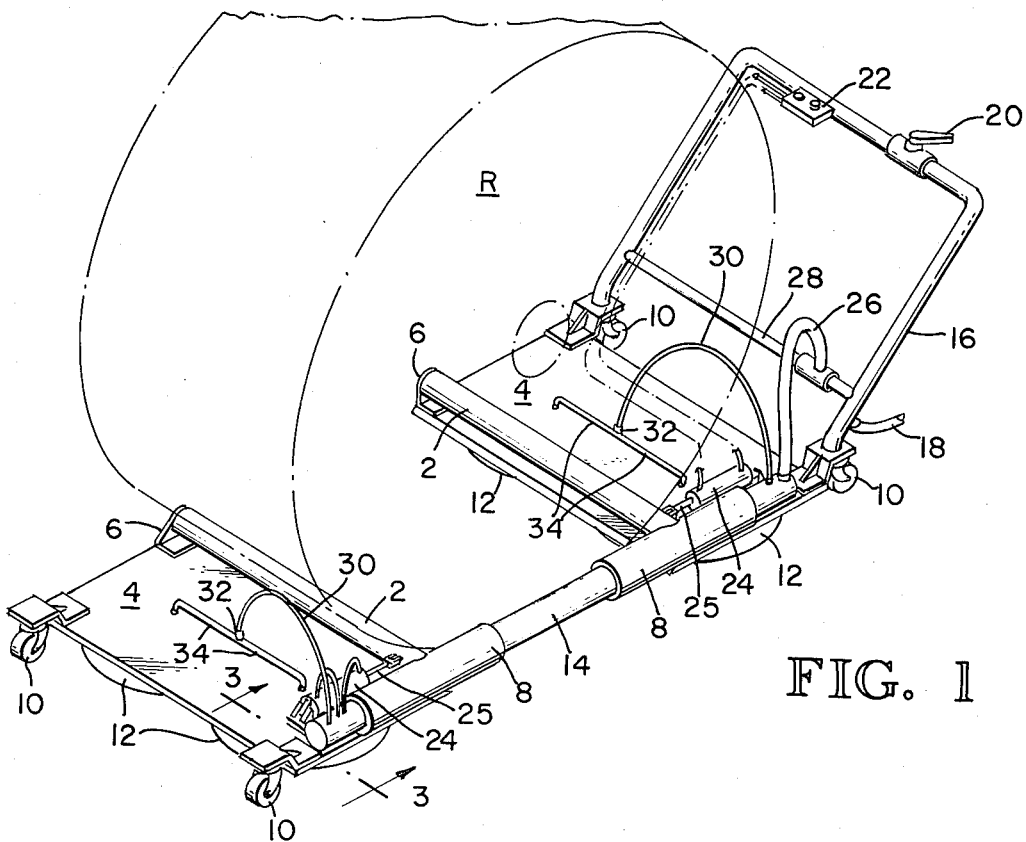
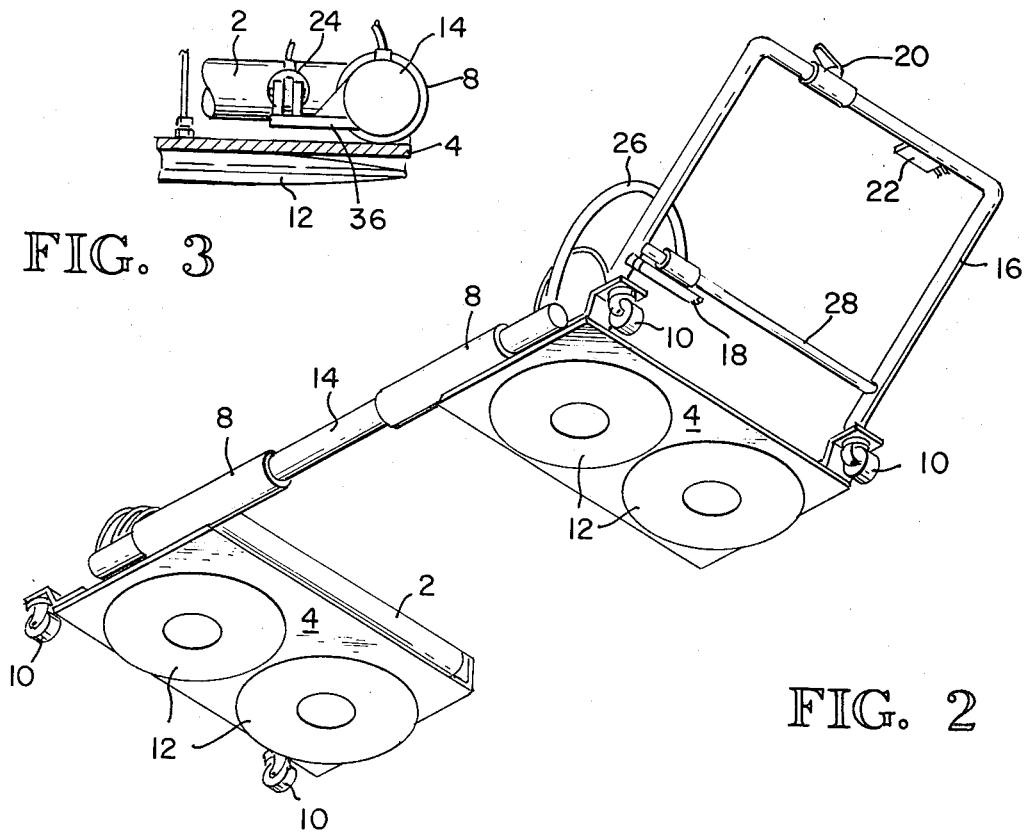
FIG. 1
FIG. 3
FIG. 2

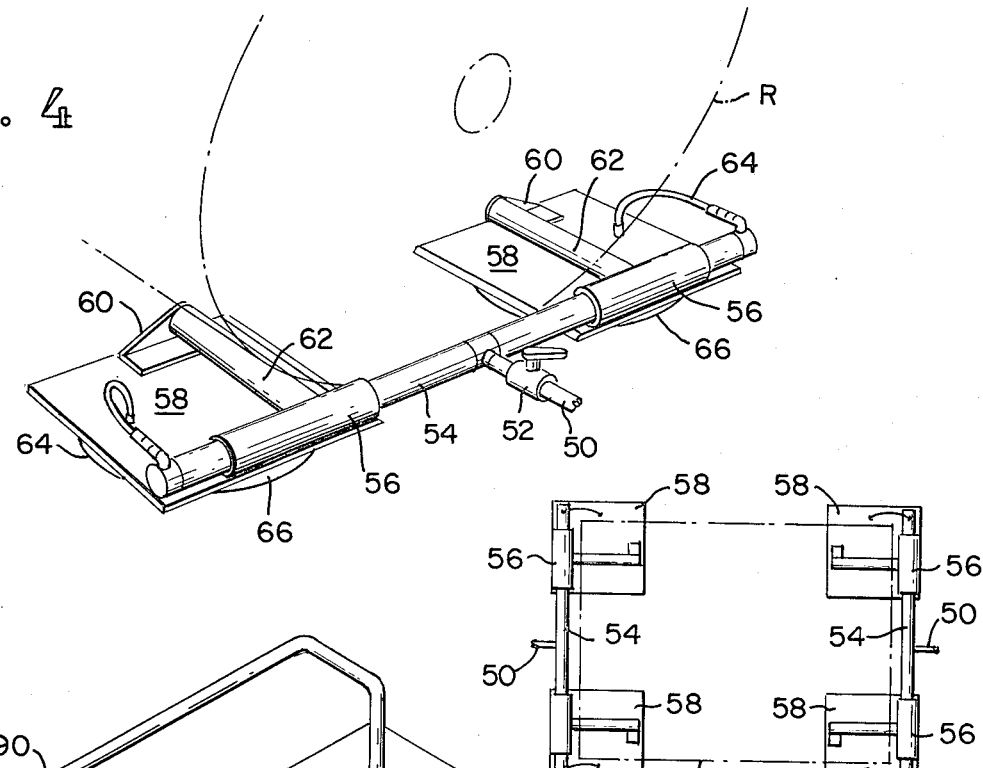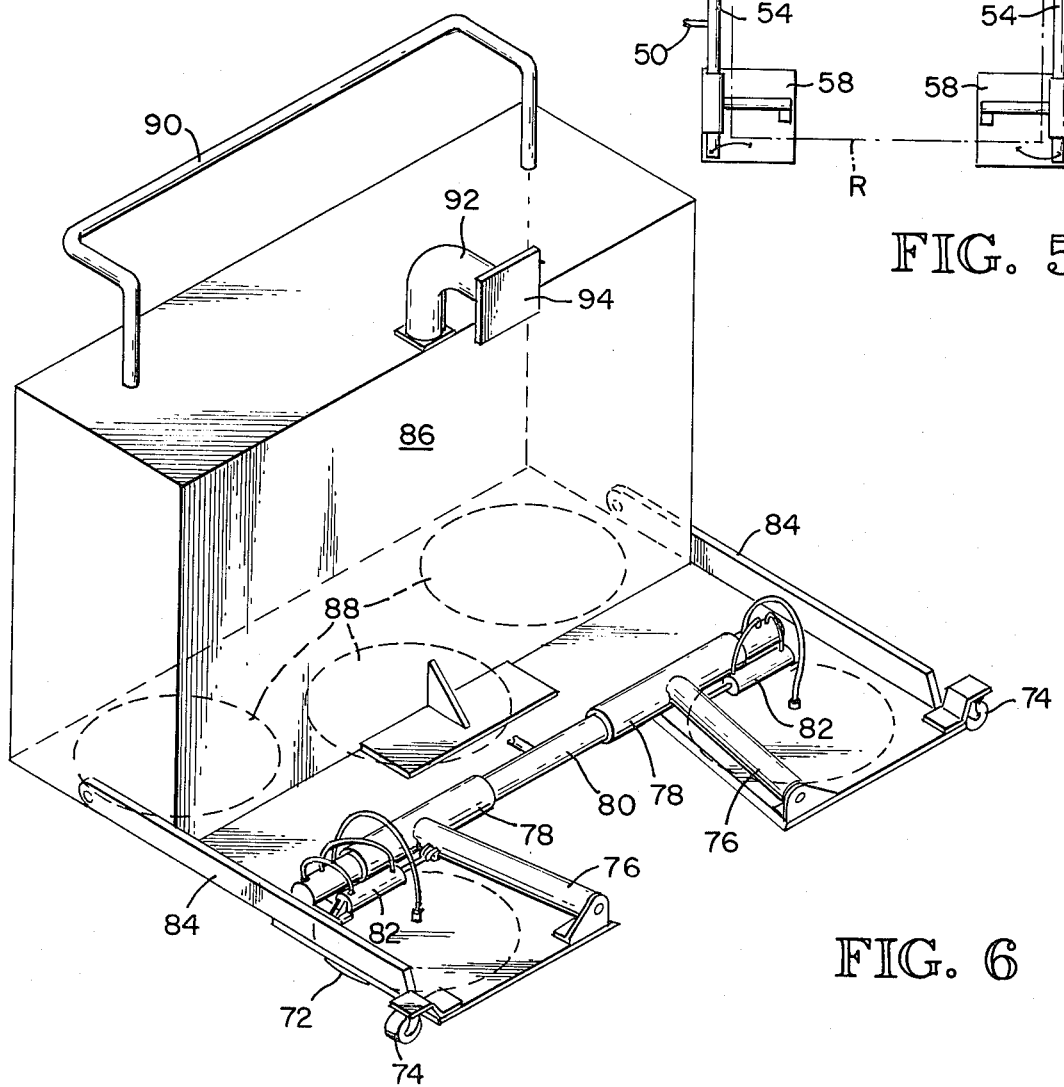

ROLL HANDLING APPARATUS

BACKGROUND OF THE INVENTION

The utilization of air bearings for assistance in transporting heavy objects is well known and specific examples of the air bearings themselves as well as the utilization thereof is illustrated in references cited hereinafter.

An area of continued problems in transport has been that of efficiently handling large rolls or reels. One of the problems with these particular products or packages has been the fact that although they are substantially uniform in exterior configuration, i.e. not irregular, they are not easily transportable with the standard equipment such as a forklift, pallet or the like. As is obvious, the fact that the exterior surface is curved thus permits the object to roll if on an uneven surface, a problem necessitating care. Further, the fact that the exterior surface, particularly in the case of paper rolls, is subject to damage creates special problems. In the past, these particular objects, i.e. generally cylindrical, have been handled by several people, physically overcoming the inertia, or in the alternative by particularly designed equipment trucks, forklift or pallets having special configurations. The fact that special handling equipment has been required or the fact that several people have been involved in the movement of these objects has proven to be exceedingly costly both in terms of financial outlay and the loss of otherwise productive equipment or personnel.

The current invention recognizes that air bearings and air bearing conveying devices for rolls of material and other round shapes is not new, however, the embodiment of this invention allows a paper roll or other round shapes to be independently picked up off the floor and transported or positioned during various manufacturing and/or process procedures. Prior art with mechanical means such as wheels, lift tables, overhead crane or conveying devices are all well established in the industry as are air bearing supported pallets with various configurations of chock devices for saddling the roll during transport and positioning. This invention addresses itself towards the latter. Prior air bearing art required the roll be placed on the air pallet by an overhead crane or rolled onto the pallet from an elevated platform which has a similar co-planar relationship with the pallet top deck. In the latter case, a removable or retractable chock is employed to allow side entry onto the pallet. No other air bearing device has been conceived that would independently and effectively pick a roll up off the floor in an unassisted manner.

It is therefore proposed that the present invention deals with a lightweight, inexpensive means for handling large objects such as paper rolls or reels of material and enables these objects, in spite of their tremendous weight, to be handled quickly and accurately by one person. The present invention also requires a minimum of working space and external power to enable the rapid and easy movement of these objects thus enabling an individual to place the objects in position adjacent to or within reach of a paper handling machine without the necessity of expensive transfer equipment. The random or omni directional capability allows more efficient use of space in the immediate area of the process operating machinery.

Prior art known to the inventor which discloses the utilization or construction of air bearings include the following:

U.S. Pat. No. 3,245,487 granted to Mackie, Apr. 12, 1966, which discloses a self-regulating air bearing.

U.S. Pat. No. 3,326,311 granted to Jung, June 20, 1967, which discloses a pallet type device supported by an air bearing.

U.S. Pat. No. 3,513,936 granted to Crowley et al. May 26, 1970 which discloses an improved air bearing device.

U.S. Pat. No. 3,513,936 granted to Crowley et al. on May 26, 1970 which discloses an air bearing device.

U.S. Pat. No. 3,613,694 granted to Crowley which discloses another air bearing device.

U.S. Pat. No. 3,655,074 granted to Pipes on Apr. 11, 1972 which discloses a warehouse apparatus with an air bearing supporting stacking device.

With the above noted prior art and problems in mind, it is an object of the present invention to provide a simple, inexpensive means for transporting large rolls of paper or the like.

It is another object of the present invention to provide means whereby a single person can load, transport and unload, or position in a machine, a roll of paper or the like weight thousands of pounds.

It is still another object of the present invention to provide an easily adjustable device wherein large rolls of varying diameter and weight may be easily handled.

Still a further object of the present invention is to produce a device having outwardly projecting laterally adustable arms supported by air bearings for cradling a roll of paper or the like.

Still a further object of the present invention is to provide an air bearing supported device for cradling a roll of paper or the like and further including means to prevent the accidental tipping of a narrow roll.

Another object of the present invention is to provide a device which may be used singly for short rolls or as a pair for wide rolls.

BRIEF DESCRIPTION OF THE DRAWINGS

FIG. 1 is a pictorial representation of one embodiment of the roll handling device in accordance with the present invention showing a roll in position for transport.

FIG. 2 is a view of the roll handling device of FIG. 1 as seen from the bottom showing the placement of the air bearings.

FIG. 3 is a sectional view taken along lines 3—3 of FIG. 1.

FIG. 4 is another embodiment of the roll handling device without handles or the like.

FIG. 5 is a plan view of a method for utilizing two of the devices as shown in FIG. 4.

FIG. 6 is a roll handling device with a stabilizing bar or arm to support and thus to prevent the tipping of narrow rolls.

DETAILED DESCRIPTION OF THE DRAWINGS

Figure 7:
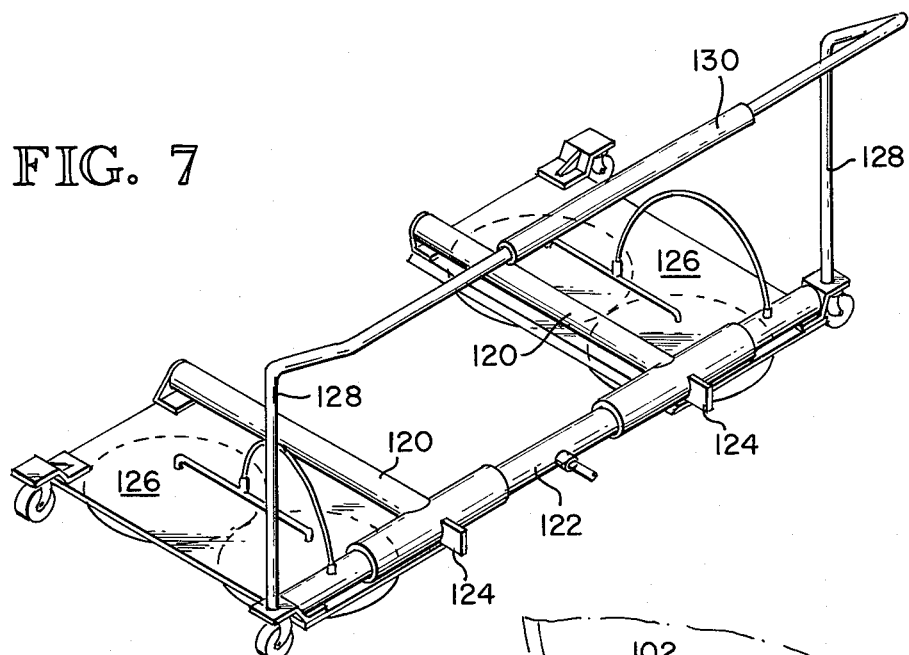
FIG. 7 is another species of roll handling apparatus in accordance with the present invention.

As shown in FIG. 1, one embodiment of the roll handling apparatus includes a pair of parallel load arms 2 which are secured to a load deck 4 by means of a bracket 6 on one end and a sleeve member 8 on the opposite end, both of which are secured to the platform by welding or the like. Load deck 4 is supported, when empty, by casters 10 secured to the outer edge of the platform and when loaded by air bearings 12, mounted beneath the platform. Sleeves 8 are slidably mounted upon a central support and conduit member 14 and as explained hereinafter are movable therealong at the command of the operator.

At one end of the roll handling device there is mounted an upwardly and outwardly extending handle 16 having interconnected therewith a detachable air supply hose 18 and further having mounted thereon at a convenient location a main air valve 20 for controlling fluid flow to the air bearings 12 as well as a control valve 22 which, as explained hereinafter, controls the position of the load arms 2. As can be seen, there is mounted upon each end of the central support and conduit 14 a two-way pneumatic ram 24 which has the outer end of its piston rod 25 connected to the load arm 2. Thus as can be seen, actuation of the valve 22 will either move the load arms 2 and the load platforms 4 toward or away from each other to accommodate rolls of differing diameter.

Conduit 26 which extends from crossbar 28 of handle 16 to the outer end of the central support rod 14 conducts the necessary air to inflate the air bearings. The fluid is transferred via conduit 30 to a T-connection 32 in a pair of conduits 34 which carry the air through the load deck to the air bearings themselves.

Referring now to FIG. 2, the apparatus can be seen from the underside and the relationship between the air bearings 12 and the load deck 4 and its interconnected arm 2 and sleeve member 8 as well as casters 10 may be readily seen. As explained herinabove, the operator may, by operation of the valve 22, move the sleeves and their connected load platform closer together or further away to adjust for the size of the roll being transported.

Referring now to FIG. 3, it can be seen that the two-way pneumatic ram 24 is secured to a bracket 36 which is in turn welded to the stationary or central conduit 14 so that the load arm 2 may be moved relative to the central support conduit 14.

Reference in now had to FIG. 4 wherein the simplest embodiment of the present invention is shown. As seen in this embodiment, an air supply hose 50 feeds through a valve 52 to the central support and distributor conduit 54 upon which are mounted axially movable sleeves 56. Each sleeve 56 has secured thereto a load platform 58 having mounted thereon along the outer edge a bracket 60. A load arm 62 extends between the bracket 60 and the sleeve 56 and is movable therewith so that the distance between the load arms may be adjusted to accommodate rolls of different sizes.

At the outward ends of the central distributor support conduit 54 is a flexible conduit 62, 64 which provides air under pressure to the fluid bearing 66 located beneath the load platform 58.

As seen in FIG. 5, the roll handling device as shown in FIG. 4 will be used in opposing pairs to support rolls of substantial width.

As seen in FIG. 6, a modified inventive apparatus, particularly designed to transport short rolls is detailed. As seen in this view, a pair of load platforms 70 are each supported by a single air bearing 72 hand have secured thereto at the outer end casters 74 and load arms 76 extending along the inner edge. Load arms 76 are secured to sleeves 78 which are slidably mounted upon a central support and distributing conduit 80 much in the same fashion as described with respect to the embodiment of FIG. 1. Also to be noted in this embodiment are a pair of pneumatic rams 82 for moving the load platforms and arms axially along the support bar 80. The load platform 70 also has secured thereto a pair of parallel arm members 84 which extend rearwardly of the load platform and are pivotally secured to a counter balance structure 86 which is weighted to offset the weight of a roll and supported by three or more air bearings 88. Although not shown, the air bearings 88 could be under separate control from bearings 76 to allow easy movement of the device or alternatively, heavy duty casters could support the counter weight when the device is empty. At the upper portion of the counter weight structure there is secured an outwardly extending handle means 90 for guiding the device whether loaded or empty and a forwardly extending brace or support which includes a curved neck portion 92 and a roll contacting plate member 94. The load arms 76 angle slightly outwardly toward the counter weight to tip the roll against plate 94. When a roll is in position upon the load platform and captured by the load arms, the bearings 72 are inflated which causes the roll to tip back against the support plate 94 and thus be secure for transport.

Yet another modification of the present apparatus can be seen in FIG. 7 wherein the support arms 120 are mounted to the central support and conduit member 122 but instead of having pneumatically actuable support arms 120 a pair of kick plates 124 are located to the rear of the device so that an operator can manually move the load support arms and their attached load platforms 126 into proper position. The handle ends are secured to the caster brackets and therefore, do not move with the load platforms.

Figure 8:
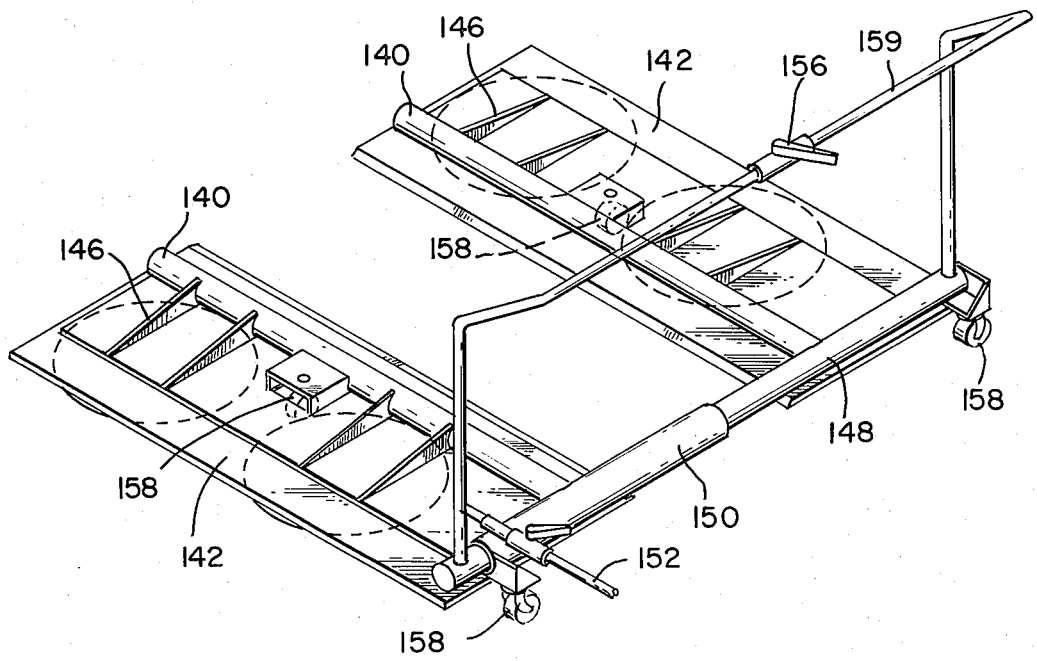
FIG. 8 is another embodiment of a roll handling apparatus in accordance with the present invention.

As seen in FIG. 8, yet another modification is shown and in this particular modification, the support arms 140 are again secured to a load platform 142 but also include reinforcing members 146. The load platforms 142, rather than being each mounted to a sleeve, has one mounted directly to the main conduit or support 148 and has the other mounted to a sleeve 150 for movement along conduit 148. Thus as can be seen, the operator can change the distance between the two support arms 140 by simply moving slide 150 along 148. A typical air supply 152 feeds into the handle 154 which includes a control valve 156. Although this particular device is likewise supported by casters 15 it is to be noted that the casters are located approximately centrally of the load platform for greater clearance at the forward end of the load platform for particular environments.

Figure 9:
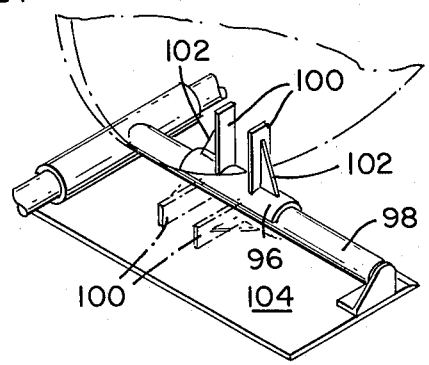
FIG. 9 is an enlarged view of a reel retainer for use with the present invention.

Referring now to FIG. 9, a modification is shown enabling the easy handling of reels or the like. Because of the minimal contact between the reel edge and the support, particularly with respect to the embodiment of FIGS. 4 and 5, an anti-tip device is used to capitalize upon the rigidity of the reel itself. A partial sleeve 96 is rotatably secured to the support arm 98. A pair of upstanding spaced plates 100 rigidified by members 102 are used to engage the reel flange, one plate on each side. When not in use, the sleeve and the plates are rotated so that the plates rest against the top of the platform 104 out of the way for handling rolls.

Thus as can be seen, the present invention provides a unique and readily adaptable and easily controlled device for supporting and transporting rolls of substantial size and weight.

What is claimed is:

1. A device supported by air bearings, for transporting rolls of paper or the like, said device comprising:
    a pair of opposing platform means designed to support a roll without damage thereto, movable relative to each other and having secured to each of their bottom surfaces at least one air bearing,
    rigid means at one end of the platform means interconnecting and defining the relative movement of the platform means which are slidably mounted thereon,
    means supplying air under pressure to the bearings, and
    control means whereby the device may be placed adjacent the roll to be transported with the platform means extending in the direction of the axis of the roll along either side thereof and beneath the roll at a distance from each other which is less than the outer diameter of the roll whereby the roll will be lifted upon inflation of the bearings and thus transported to the desired location.

2. A device as in claim 1, wherein the platform means include roll contacting elements mounted upon the upper surface of the platform means.

3. A device as in claim 2, wherein the roll contacting elements are parallel.

4. A device as in claim 1, and further including handle means enabling easy movement by the operator.

5. A device as in claim 2, wherein an upstanding roll support is located adjacent the interconnecting means to contact and support the roll.

6. A device for handling rolls of paper or the like comprising:
    a pair of substantially parallel arms slideably secured to an interconnecting member generally perpendicular to the pair of arms, whereby the arms may be moved to accommodate various sized rolls,
    platform means secured to and supporting each of the arms and having mounted to the bottom surface thereof fluid bearing means and means providing fluid under pressure to the bearings enabling an easy lift and transport.

* * * * *